United States Patent [19]

Streit et al.

[11] Patent Number: 5,902,351
[45] Date of Patent: May 11, 1999

[54] APPARATUS AND METHOD FOR TRACKING A VEHICLE

[75] Inventors: Donald A. Streit; John F. Gardner; Aleksandr Brandt, all of State College, Pa.

[73] Assignee: The Penn State Research Foundation, University Park, Pa.

[21] Appl. No.: 08/518,764

[22] Filed: Aug. 24, 1995

[51] Int. Cl.$^6$ .................................................. G06G 7/78
[52] U.S. Cl. .................... 701/220; 701/207; 73/178 R; 340/990; 340/995
[58] Field of Search ................ 364/424.012, 424.027, 364/44.2, 449.1, 460, 461, 449.7, 450, 454, 453, 459; 73/178 R; 340/994, 995, 990, 988; 342/357, 457, 455, 456; 701/208, 207, 224

[56] References Cited

U.S. PATENT DOCUMENTS

| | | | |
|---|---|---|---|
| 4,032,759 | 6/1977 | Danik | 364/453 |
| 4,321,678 | 3/1982 | Krogmann | 364/453 |
| 4,774,671 | 9/1988 | Itoh et al. | 364/449 |
| 4,774,672 | 9/1988 | Tsunoda et al. | 364/449 |
| 4,800,501 | 1/1989 | Kinsky | 364/453 |
| 4,823,626 | 4/1989 | Hartmann et al. | 364/453 |
| 4,879,658 | 11/1989 | Takashima et al. | 364/449 |
| 4,888,699 | 12/1989 | Knoll et al. | 364/449 |
| 4,890,233 | 12/1989 | Ando et al. | 701/224 |
| 4,914,598 | 4/1990 | Krogmann et al. | 364/424.021 |
| 4,937,751 | 6/1990 | Nimura et al. | 364/449 |
| 4,970,652 | 11/1990 | Nagashima | 364/449 |
| 4,989,151 | 1/1991 | Nuimura | 364/449 |
| 5,012,424 | 4/1991 | Dodson | 364/449.1 |
| 5,016,007 | 5/1991 | Iihoshi et al. | 340/995 |
| 5,046,011 | 9/1991 | Kakihara et al. | 364/449 |
| 5,051,751 | 9/1991 | Gray | 364/516 |
| 5,060,162 | 10/1991 | Ueyama et al. | 364/449 |
| 5,075,673 | 12/1991 | McMillan et al. | 701/207 |
| 5,152,239 | 10/1992 | Hossfield et al. | 114/144 |
| 5,166,882 | 11/1992 | Stambaugh | 364/364 |
| 5,177,685 | 1/1993 | Davis et al. | 364/443 |
| 5,184,304 | 2/1993 | Huddle | 364/453 |
| 5,194,872 | 3/1993 | Musoff et al. | 364/453 |
| 5,278,424 | 1/1994 | Kagawa | 250/561 |
| 5,283,575 | 2/1994 | Kao et al. | 340/990 |
| 5,297,050 | 3/1994 | Ichimura et al. | 701/208 |
| 5,297,052 | 3/1994 | McIntyre et al. | 364/453 |
| 5,311,173 | 5/1994 | Komura et al. | 340/995 |
| 5,311,195 | 5/1994 | Mathis et al. | 342/357 |
| 5,311,435 | 5/1994 | Yocum et al. | 364/459 |
| 5,394,333 | 2/1995 | Kao | 364/450 |
| 5,398,188 | 3/1995 | Maruyama | 364/449 |
| 5,574,650 | 11/1996 | Diesel | 364/453 |

*Primary Examiner*—Jacques H. Louis-Jacques
*Attorney, Agent, or Firm*—Thomas J. Monahan

[57] ABSTRACT

An apparatus and method for tracking a vehicle is provided. The vehicle tracking system may include an inertial measurement unit for providing inertial vehicle state characteristics of the vehicle. The inertial measurement unit may include at least one gyro and at least one accelerometer. The vehicle tracking system additionally includes an inertial converter for generating vehicle state information from the inertial vehicle state characteristics. Clinometers are utilized within the vehicle tracking system to initialize the gyros and may additionally provide acceleration information. The vehicle tracking system may additionally include one or more redundant sensors for providing redundant state information. The redundant sensors can include an odometer/tachometer, Global Positioning System receiver, tag receiver, and a map matching system. A Kalman filter may be utilized to reduce error within the vehicle tracking system and improve the accuracy thereof.

18 Claims, 2 Drawing Sheets

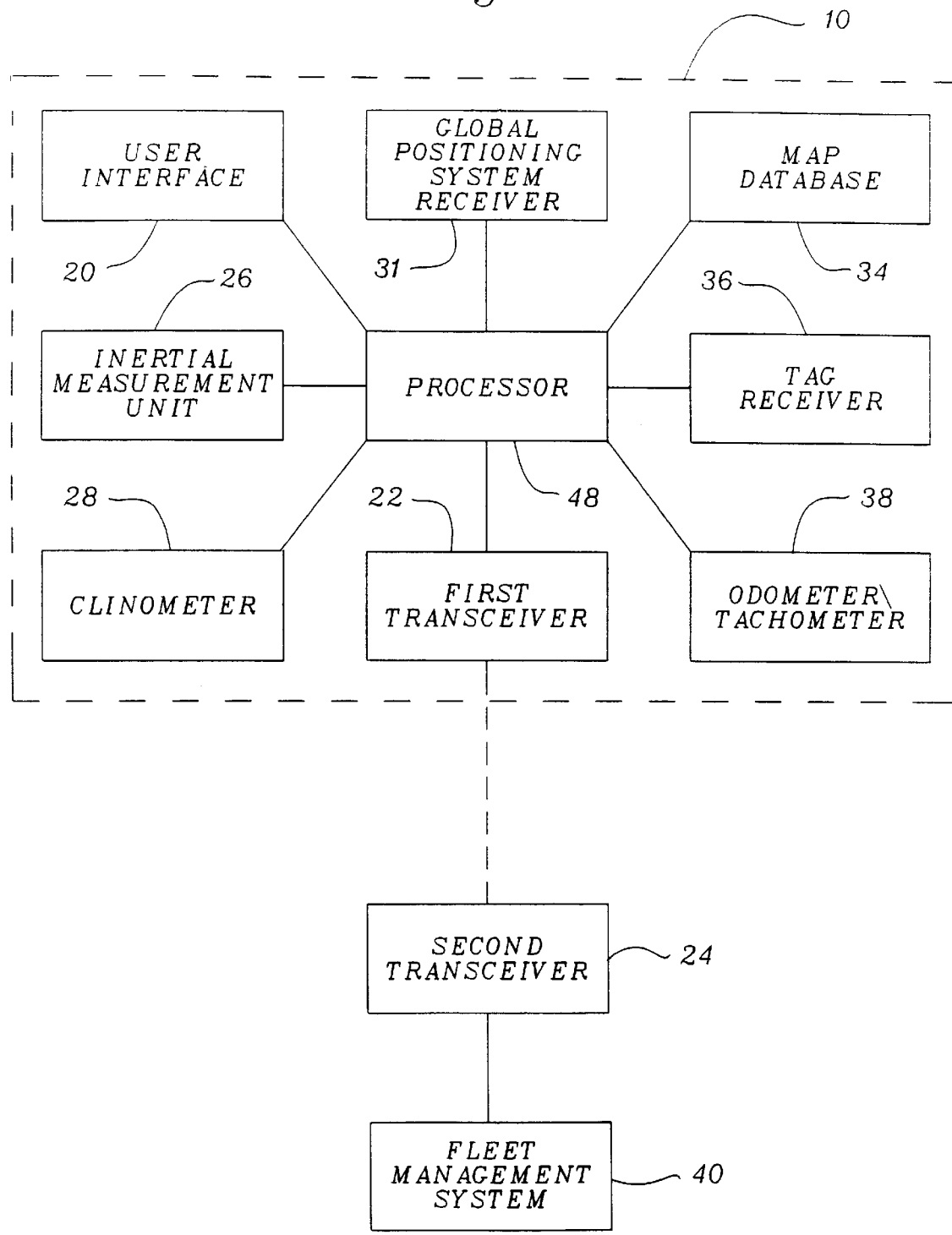

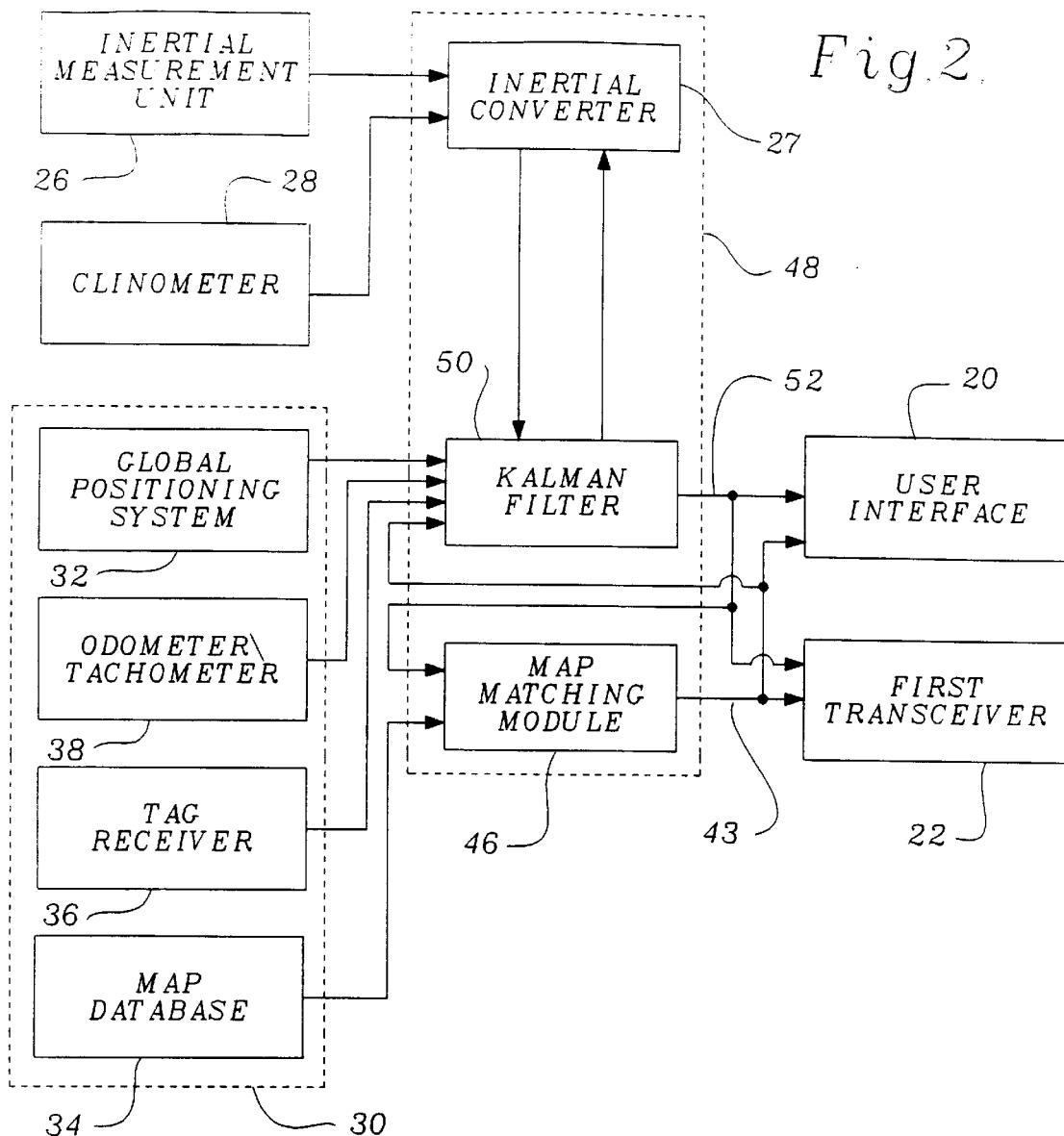
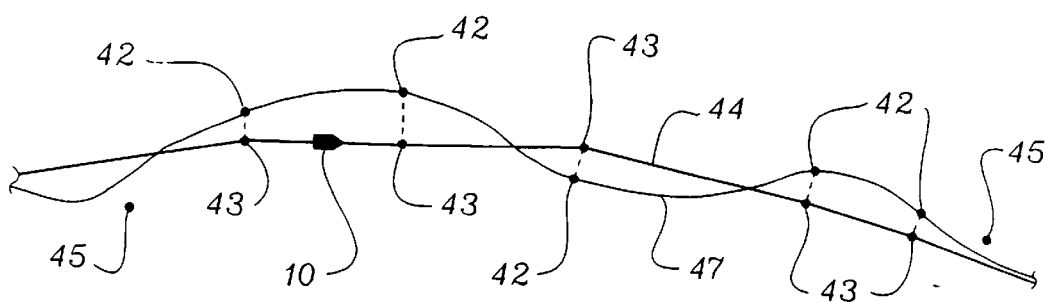

APPARATUS AND METHOD FOR TRACKING A VEHICLE

BACKGROUND OF THE INVENTION

This invention relates generally to the tracking of vehicle motion, and more particularly, to the utilization of redundant vehicle state information and clinometers to provide accurate measurements of the vehicle state in real time.

The interest in the tracking of land vehicles has recently increased dramatically. Vehicle tracking is an applied science which utilizes a variety of techniques and approaches to determine vehicle state information. The vehicle state information may include present position, velocity, acceleration as well as attitude information.

For centuries, the position and course of ships were determined by celestial observations and compass readings. Subsequently, similar technology was utilized for aircraft navigation. More recently, radio location systems, inertial measurement systems (IMS), and Global Positioning Systems (GPS) have been utilized to assist with the tracking and navigation of vehicles. In addition, map matching has also been introduced to reduce time based error in vehicle tracking and navigation systems.

Vehicle tracking and navigation systems provide an abundance of useful information related to the vehicle state. This information may be utilized by the driver for planning the best possible route to reach a particular destination and may include distance and direction information as well as detailed guidance instructions.

Additionally, the vehicle tracking systems may be utilized in a fleet management system wherein a central control facility remotely monitors the status of individual vehicles. Typical applications include bus schedule control, police car dispatching, and emergency car dispatching. Location and status data may be transmitted between the plurality of vehicles and the central control facility via radio communication.

Inertial measurement units or guidance systems were developed in Germany during the Second World War. These initial inertial systems were generally utilized for determining desired flight attitude in aircraft and measuring acceleration or thrust along a longitudinal axis.

More recently, inertial measurement units have been utilized to assist with the tracking and navigation of land vehicles. Specifically, inertial measurement units can monitor the acceleration vector of a land vehicle in motion. The inertial measurement units generally consist of various combinations of inertial sensors including one to three gyros and one to three accelerometers. Additional sensors may be utilized to provide fault tolerant operation.

The gyros used in the inertial measurement unit measure the angular velocity of the vehicle with respect to inertial space and the accelerometers measure the linear acceleration of the vehicle. The angular orientation of the vehicle may be obtained by integrating the output of the gyros with respect to time. The linear velocity and position of the vehicle may be obtained by integrating the accelerometer output with respect to time and performing appropriate coordinate transformations.

Some tracking subsystems such as dead reckoning or inertial measurement systems inherently accumulate error over time. While this error may be reduced through various error collapsing schemes, the accuracy of the entire vehicle tracking system will be drastically improved if the error is minimized before the vehicle begins to move.

Other errors may arise in the vehicle tracking subsystems due to noise in the tracking instruments, processing limitations and errors in the map database if map matching is utilized. Therefore, the accuracy of the vehicle tracking system is greatly improved if an increased amount of vehicle state information, including redundant vehicle state information, is utilized by the vehicle tracking system.

SUMMARY OF THE INVENTION

This invention provides for a vehicle tracking system which preferably utilizes redundant sensor integration for providing error reduction and accurate vehicle state information. In addition, the vehicle tracking system utilizes clinometers for increasing the accuracy of the vehicle tracking system during the initial stages of vehicle movement.

In particular, the vehicle tracking system in accordance with the present invention includes an inertial measurement unit which includes one or more gyros and one or more accelerometers for providing inertial state characteristics of the vehicle. The vehicle tracking system additionally includes an inertial converter coupled with the inertial measurement unit for obtaining vehicle state information from the inertial state characteristics. One or more clinometers are implemented in the vehicle tracking system for initializing the gyros and providing vehicle acceleration information.

The vehicle tracking system preferably includes a plurality of redundant sensors coupled with the filter for providing redundant vehicle state information. The redundant sensors can include wheel rotation sensors such as an odometer or tachometer, a Global Positioning System receiver, a tag receiver or a map matching system. The vehicle tracking system preferably includes a recursive estimation filter coupled with the inertial converter and redundant sensors for removing noise from the vehicle state information and outputting corrected vehicle state information.

BRIEF DESCRIPTION OF THE DRAWINGS

FIG. 1 is a functional block diagram of a vehicle tracking system and a fleet management system;

FIG. 2 is a functional block diagram of a vehicle tracking system in accordance with the present invention; and FIG. 3 is a diagram of a vehicle travelling on a route.

DESCRIPTION OF THE PREFERRED EMBODIMENTS

The vehicle tracking system according to the present invention provides an apparatus and a method for determining vehicle state information including position, velocity, acceleration, and attitude.

As shown in FIG. 1, the vehicle 10 is equipped with a plurality of sensors and a processor 48 for obtaining vehicle state information. The vehicle state information may be utilized on board the vehicle 10 to inform the driver, via a user interface 20, of present position, velocity and acceleration as well as attitude information.

Alternatively, the vehicle 10 may include a first transceiver 22 for transmitting the vehicle state information to a second transceiver 24 and a fleet management system 40 for remote monitoring of the vehicle 10. The vehicle state information may be utilized by the fleet management system 40 to coordinate the dispatching of the vehicles 10 or monitor public transportation vehicles 10.

The vehicle tracking system preferably includes an inertial measurement unit 26 for providing vehicle state information including position, velocity, acceleration and attitude of the vehicle 10. The inertial measurement unit 26 can include a plurality of inertial sensors including one or more gyros and one or more accelerometers.

Preferably, the inertial measurement unit 26 consists of a full set of strapdown inertial instruments including three orthogonally oriented gyros and three orthogonally oriented accelerometers. However, the inertial measurement unit 26 provides accurate vehicle state characteristics with three orthogonally oriented gyros and a single accelerometer aligned with the mean direction of the linear vehicle velocity vector.

The accelerometer of the inertial measurement unit 26 provides the linear velocity of the vehicle 10 while the gyros provide angular rotational rates of the vehicle. The gyros are preferably oriented to provide attitude information including roll, pitch and heading of the vehicle 10. The vehicle state characteristics from the inertial measurement unit 26 may thereafter be forwarded to an inertial converter 27 as shown in FIG. 2.

The inertial converter 27 may be organized into a velocity module and an attitude module. The velocity module of the inertial converter 27 may obtain velocity information of the vehicle 10 by integrating the accelerometer output with respect to time. Further, the position of the vehicle 10 may be approximated by integrating the velocity information with respect to time.

The attitude module may integrate the rotational rate measured by each gyro to provide an instantaneous angular orientation of the vehicle 10. However, the initial orientation of the vehicle must be known in order to obtain accurate information from the gyros.

Therefore, the vehicle tracking system may include one or more clinometers 28 for initializing the gyros, and additionally providing vehicle state information. Operating in a static mode, the clinometers 28 measure the angle between the gravity vector and an axis of orientation of the clinometer 28. Preferably, two clinometers 28 are utilized by the vehicle tracking system for measuring the roll and pitch of the vehicle 10 while the vehicle is not accelerating. The output of the clinometers 28 in the static mode may thereafter be forwarded to the inertial converter 27 for initializing the roll and pitch gyros of the inertial measurement unit 26.

The output of the clinometers 28 may additionally be processed during a dynamic mode wherein the vehicle is accelerating. The clinometer output approximates the acceleration of the vehicle 10.

The vehicle tracking system may additionally include a plurality of redundant sensors 30 as shown in FIG. 2. The redundant sensors 30 obtain redundant vehicle state information through a variety of methods to help reduce error within the vehicle tracking system.

The redundant sensors 30 may include an absolute tracking system such as a Global Positioning System (GPS) 32. The vehicle can be equipped with a Global Positioning System receiver 31 as shown in FIG. 1 for receiving position data of the vehicle 10 from the Global Positioning System 32.

The use of a Global Positioning System 32 is advantageous inasmuch as the position data is determined independent of previous data. Therefore, error within the Global Positioning System 32 will not increase over a period of time. Additional sensors may be utilized within the vehicle tracking system inasmuch as Global Positioning Systems 32 are limited by line-of-sight coverage, weather conditions and terrain characteristics.

The vehicle tracking system may therefore include a map matching system for providing continuous correction of the heading and position of the vehicle 10 when recognizable road features are identified. An example of a map matching system for collapsing error within the vehicle tracking system is disclosed in the Applicant's copending U.S. patent application Ser. No. 08/518,639, filed Aug.24, 1995, which is entitled "Map Matching Navigation System," has Attorney's Docket No. 950464, and is incorporated herein by reference.

The map matching system may include a map database 34 and a map matching module 46 as shown in FIG. 2. Map matching systems depend on an accurate map database 34 in order to provide reliable and useful vehicle state information. Therefore, the map database 34 is preferably generated from numerous sources to eliminate obsolete or inaccurate data.

The operation of a map matching system is shown with reference to FIG. 3. In particular, the inertial measurement unit 26 obtains vehicle state characteristics as the vehicle 10 travels on a vehicle route 47. The vehicle state characteristics are forwarded to the inertial converter 27 to provide vehicle state information. This vehicle state information may include position information defined as a plurality of measured points 42. The measured points 42 may vary from a map route 44 as shown in FIG. 3 due to approximation error, map database error, digitization error and the like.

The map matching module 46 is configured to match each measured point 42 to a matched point 43 on the map route 44. The matched points 43 correspond to the measured points 42 and are the most probable locations of the vehicle 10 on the map route 44. Furthermore, the position of the vehicle 10 may be updated on the map route 44 at a plurality of positions wherein the location of the vehicle 10 is known with a high level of confidence. These locations may include the end of curves in the map route 44 and recognizable road features.

The map matching module 46 may additionally be utilized to update heading information of the vehicle 10 with information stored within the map database 34 at positions on the map route 44 wherein the confidence level of the vehicle position is high.

The vehicle tracking system may further include a plurality of tags 45 or proximity beacons located at a plurality of positions adjacent the vehicle route 47. The tags 45 may be passive tags which transmit information in response to an interrogation signal from the vehicle 10 as the vehicle 10 passes each individual tag 45. The tags 45 can be transponders.

Each tag 45 may transmit information including position, velocity, route location, route identification, tag number and the like. The vehicle 10 is preferably equipped with a tag receiver 36 for receiving the transmitted vehicle state information from the tag 45 for reducing the error within the vehicle tracking system. The tag receiver 36 can be a transponder read device.

The vehicle tracking system may alternatively include a plurality of tags 45 which are infrared beacons positioned adjacent the vehicle routes 47. The tag receiver 36 would therefore include an infrared receiver for receiving the tag information.

The redundant sensors 30 of the vehicle tracking system may further include a sensor such as an odometer/tachometer 38 for measuring the rotation of a wheel of the vehicle 10. The odometer counts the number of rotations of a wheel of the vehicle 10 and may therefore provide distance information as the vehicle 10 travels on the vehicle route 47. The tachometer additionally counts the number of rotations over a specified period of time and may provide velocity information of the vehicle 10.

Each redundant sensor 30 may introduce error into the vehicle tracking system (e.g. error in odometer/tachometer data due to vehicle wheel slippage). Therefore, the vehicle tracking system preferably includes a recursive estimation filter for removing error from the vehicle state information provided by the Global Positioning System 32, map database 34, tag receiver 36, odometer\tachometer 38, inertial measurement unit 26, and inertial converter 27. The clinometers 28 may additionally provide vehicle state information to the Kalman filter 50 during vehicle acceleration. The recursive estimation filter can be a Kalman filter 50.

The vehicle state information from the inertial measurement unit 26 and the redundant sensors 30 may be applied to the Kalman filter 50 as shown in FIG. 2. The Kalman filter 50 utilizes the vehicle state information in order to estimate sources of error within the vehicle tracking system. In effect, the Kalman filter 50 uses each new vehicle state observation to update a probability distribution for the state of the vehicle. The Kalman filter 50 is additionally efficient in operation inasmuch as the filter does not refer back to previous observations of the vehicle state. Accordingly, the Kalman filter 50 is tailored to real-time applications for providing on the spot decision making.

As previously described, the Kalman filter 50 may collapse or reduce error within the vehicle tracking system through the processing of vehicle state information from the redundant sensors, inertial measurement unit 26, and inertial converter 27. Furthermore, the Kalman filter 50 is preferably configured to assign independent weights to the vehicle state information provided from each source depending upon the level of confidence in the accuracy of the source.

As shown in FIG. 2, the Kalman filter 50 integrates the vehicle state information from the inertial converter 27 and each redundant sensor 30 and provides an output 52 of corrected position, velocity and attitude information. In addition, the Kalman filter 50 may feedback biases of the inertial measurement unit 26 to correct future output from the inertial converter 27.

The output 52 of the Kalman filter 50 may additionally be applied to the map matching module 46 which may be utilized for determining the matched points 43. The matched points 43 may thereafter be applied to the Kalman filter 50 for integration with the vehicle state information.

The matched points 43 may additionally be applied to the user interface 20 for displaying the approximate location of the vehicle 10 on the map route 44 or to the transceivers 22, 24 and the fleet management system 40 for remote monitoring. The corrected position, velocity and attitude information from the Kalman filter 50 may additionally be applied to the user interface 20 or the transceivers 22, 24 and the fleet management system 40.

The Kalman filter 50 and the map matching module 46 and the inertial converter 27 may be implemented in a processor 48 for flexibility.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting to the scope of the invention which is to be given the full breadth of the following claims and all equivalents thereof.

We claim:

1. An apparatus to obtain vehicle state information, comprising:
    a. an inertial measurement unit including a plurality of inertial sensors to provide a plurality of vehicle state characteristics;
    b. an inertial converter coupled with said inertial measurement unit to derive inertial vehicle state information from the vehicle state characteristics;
    c. a filter coupled with said inertial converter to remove error from the inertial vehicle state information and outputting corrected vehicle state information;
    d. at least one clinometer coupled with said inertial converter to initialize the vehicle state characteristics,
    wherein said at least one clinometer is coupled with the filter to apply dynamic vehicle state information thereto, and
    wherein said vehicle state information corresponds to a position of a land based vehicle.

2. The apparatus of claim 1 wherein the inertial sensors include at least one gyro and at least one accelerometer.

3. The apparatus of claim 2 wherein said at least one clinometer initializes a pitch gyro and a roll gyro when the acceleration of the vehicle is zero.

4. The apparatus of claim 1 further comprising a plurality of redundant sensors coupled with said filter to provide redundant vehicle state information.

5. An apparatus to obtain vehicle state information, comprising:
    a. an inertial measurement unit including a plurality of inertial sensors to provide a plurality of vehicle state characteristics;
    b. an inertial converter coupled with said inertial measurement unit to derive inertial vehicle state information from the vehicle state characteristics;
    c. a filter coupled with said inertial converter to remove error from the inertial vehicle state information and outputting corrected vehicle state information; and
    d. at least one clinometer coupled with said inertial converter to initialize the vehicle state characteristics,
    wherein said at least one clinometer is coupled with said filter to apply dynamic vehicle state information thereto,
    wherein said inertial sensors include at least one gyro and at least one accelerometer,
    wherein said at least one clinometer initializes a pitch gyro and a roll gyro when the acceleration of the vehicle is zero,
    wherein said at least one clinometer is coupled with said filter to apply dynamic vehicle state information thereto,
    a plurality of redundant sensors coupled with said filter to provide redundant vehicle state information, and
    wherein said redundant sensors include a wheel rotation sensor to provide velocity and distance information, a global positioning system to provide position information, a tag receiver and a plurality of physical tags to provide position and velocity information, and a map matching database and a map matching module to provide position and attitude information.

6. The apparatus of claim 5 wherein said inertial converter, said filter, and said map matching module are implemented in a processor.

7. The apparatus of claim 5 wherein said filter applies corrected vehicle state information to said inertial converter to update the derived vehicle state information therein.

8. The apparatus of claim 7 wherein said filter is a Kalman filter.

9. The apparatus of claim 8 wherein said inertial measurement unit includes three orthogonal gyros and one accelerometer.

10. The apparatus of claim 9 further comprising a user interface to display corrected vehicle state information.

11. The apparatus of claim 10 further comprising a fleet management system to receive and monitoring the corrected vehicle state information.

12. A method to determine vehicle state information, comprising the steps of:
  a. initializing at least one inertial sensor using a clinometer;
  b. extracting inertial vehicle state information from at least one inertial sensor using said clinometer;
  c. obtaining redundant vehicle state information from at least one redundant sensor;
  d. filtering the inertial vehicle state information and the redundant vehicle state information to reduce error therein;
  e. determining corrected vehicle state information from the inertial vehicle state information and the redundant vehicle state information,
wherein said vehicle state information corresponds to a position of a land based vehicle.

13. The method of claim 12 further comprising the step of updating the position and heading of the vehicle in a map matching system.

14. The method of claim 12 wherein the at least one inertial sensor includes three orthogonal gyroscopes and an accelerometer.

15. The method of claim 14 further comprising the step of updating the position and heading of the vehicle in a map matching system.

16. The method of claim 14 wherein said initializing is performed when the acceleration of the vehicle is zero.

17. A method to determine vehicle state information, comprising the steps of:
  a. initializing at least one inertial sensor using a clinometer;
  b. extracting inertial vehicle state information from said at least one inertial sensor using said clinometer;
  c. obtaining redundant vehicle state information from at least one redundant sensor;
  d. filtering the inertial vehicle state information and the redundant vehicle state information to reduce error therein;
  e. determining corrected vehicle state information from the inertial vehicle state information and the redundant vehicle state information;
  f. updating position and heading of the vehicle in a map matching system; and
  wherein said at least one inertial sensor includes three orthogonal gyroscopes and an accelerometer,
  wherein said initializing is performed when the acceleration of the vehicle is zero, and
  wherein said at least one redundant sensor includes a wheel rotation sensor to provide velocity and distance information, a global positioning system to provide position information, a tag receiver and a plurality of tags to provide position and velocity information, and a map matching system to provide position and attitude information.

18. The method of claim 17 wherein the inertial vehicle state information is extracted from the at least one inertial sensor and the filter.

* * * * *